United States Patent [19]
Young et al.

[11] Patent Number: 4,650,686
[45] Date of Patent: Mar. 17, 1987

[54] CONTROL OF BROWNING REACTIONS IN BAKED GOODS BY ADDITION OF SODA AND AN EMULSIFIER

[75] Inventors: Jerry D. Young, Springdale; Paul Seiden, Cincinnati, both of Ohio

[73] Assignee: The Procter & Gamble Company, Cincinnati, Ohio

[21] Appl. No.: 722,926

[22] Filed: Apr. 12, 1985

[51] Int. Cl.⁴ .................... A21D 2/02; A21D 2/16; A21D 3/08
[52] U.S. Cl. .................... 426/321; 426/553; 426/560; 426/613; 426/653
[58] Field of Search .................. 426/94, 103, 549, 560, 426/601, 653, 654, 553, 321, 613

[56] References Cited
U.S. PATENT DOCUMENTS

| | | |
|---|---|---|
| 2,394,791 | 2/1946 | LLoyd et al. |
| 2,689,797 | 9/1954 | Joffe . |
| 4,360,534 | 11/1982 | Brabbs et al. ................... 426/94 |
| 4,455,333 | 6/1984 | Hong et al. ..................... 426/94 |
| 4,477,479 | 10/1984 | Jervis ........................... 426/549 |
| 4,503,080 | 3/1985 | Brabbs et al. ................... 426/94 |

OTHER PUBLICATIONS

Hutchinson, P. E. et al, "Effect of Emulsifiers on the Texture of Cookies", Journal of Food Service, 42(2) pp. 399-401, (1977).
Rusch, D. T., "Emulsifiers: Uses in Cereal and Bakery Foods", Cereal Food World, 26(3), pp. 110-113, 115, (1975).
Volpe & Meres, "Use of High Fructose Syrups in White Layer Cake", The Baker's Digest, vol. 50, No. 2, pp. 38-41, (1974).
Shallenberger & Birch, Sugar Chemistry, Chapter 7, pp. 169-193, The AVI Publishing Co., Inc., Westport, CT (1975).
Matz, S. A. & Matz, T. D., Cookie and Cracker Technology, 2d ed., Chapter 15, p. 235, The AVI Publishing Co., Westport, CT (1978).
Cole, "The Maillard Reaction in Food Products Carbon Dioxide Production", J. Food Science, vol. 32, No. 3, pp. 245-250, (1967).
Prouty, W. W., "pH—Some Theoretical and Practical Considerations", The Baker's Digest, vol. 41, No. 2, pp. 48-53, (1967).
Keagy, P. M., Connor, M. A. and Schatzki, T. F., "Regression Analysis of Thiamine and Color Changes in Enriched Cookies Using Factorial Design", Cereal Chemistry, vol. 56, No. 6, pp. 567-573, (1979).

Primary Examiner—Robert Yoncoskie
Attorney, Agent, or Firm—Gary M. Sutter; Rose Ann Dabek; Richard C. Witte

[57] ABSTRACT

A method for reducing excessive browning in a baked good containing reducing sugars is described. The method comprises adding to the dough of the baked good about 0.15% to about 0.65% baking soda and about 0.10% to about 0.65% fatty acid monoglyceride esters of polycarboxylic acids and their derivatives. This combination of ingredients minimizes browning while avoiding off-flavor often associated with the addition of leavening agents to control browning. The invention is particularly useful with dual-textured cookies wherein a chewy region is made from a dough containing reducing sugars or crystallization-resistant sugars, and wherein a crisp region is made from a dough containing sucrose or readily crystallizable sugars. Browning is minimized in th reducing sugar-containing inner dough so that if the inner dough shows on the cookie surface it does not create an unattractive appearance.

10 Claims, 2 Drawing Figures

4,650,686

CONTROL OF BROWNING REACTIONS IN BAKED GOODS BY ADDITION OF SODA AND AN EMULSIFIER

TECHNICAL FIELD

The present invention relates to the control of browning reactions in baked goods by the use of a combination of baking soda and a monoglyceride ester of a polycarboxylic acid and its derivatives. The invention is particularly useful for dual-textured cookies containing reducing sugars.

BACKGROUND ART

The browning of baked goods due to caramelization of sugars, oxidative browning of sugars, and Maillard reactions (reaction of reducing sugars and amino acids) is well known in the art. Browning causes the baked goods to develop a dark color and a taste which is different from goods made from sucrose (table sugar). Browning is a problem when reducing monosaccharides, e.g., fructose or glucose and high fructose corn syrup, are used in baked goods in place of or in addition to sucrose, a non-reducing disaccharide. Various methods have been used to minimize these browning reactions. For example, it is known that these reactions occur more readily at a pH above 6. Adjustment of the pH by altering the leavening systems, in particular the soda (sodium bicarbonate) have been used to control pH in baked good dough or batter during preparation and baking, thereby controlling browning in the finished products.

Volpe and Meres, "Use of High Fructose Syrups in White Layer Cake", *The Bakers Digest,* Vol. 50, No. 2, pp. 38–41 (1976) discuss the effects of various leavening systems on batter and cake pH. The occurrence of the Maillard reaction and the resulting cake volume and color were measured in products containing high fructose corn syrup.

Shallenberger, R. S. and Birch, G. G., "Nonenzymic Browning Reactions", *Sugar Chemistry,* Chapter 7, pp. 169–193 (1975), describe color formation and flavor formation in carbonyl-amine reactions (Maillard reactions) as well as the effect of temperature, pH, moisture, and sugar type on the reaction. Color development and carbon dioxide evolution are said to increase with increasing temperature. Browning reactions are said to decrease with decreasing pH.

Prouty, W. W., "pH—Some Theoretical and Practical Considerations", *The Bakers Digest,* Vol. 41, No. 2, pp. 48–53 (1967), also discloses the use of leavening agents to control the pH of baked goods. It is stated that cake pH is related to volume, grain, color, aroma, and taste.

It has now been found that the use of various leavening acids at a concentration high enough to adequately control browning in baked goods by lowering the pH can impart an off-flavor to the baked goods, particularly in cookies containing high fructose corn syrup or invert syrups.

It is therefore an object of this invention to control the browning of baked goods and, in particular, to control the browning of cookies containing reducing sugars without development of an off-flavor in the cookies due to the additives used to control pH.

It is another object of this invention to improve the appearance of dual-textured cookies prepared from a plurality of doughs by controlling the browning of a dough containing reducing sugars so that it blends in with the color of a dough containing sucrose in the baked cookie.

These and other objects of this invention will become apparent by the description of the invention below.

All percentages are by weight unless otherwise defined.

SUMMARY OF THE INVENTION

The invention is a method for controlling browning in baked goods, comprising adding to the baked good about 0.15% to about 0.65% baking soda and about 0.10% to about 0.65% fatty acid monoglyceride ester of a polycarboxylic acid and its derivatives. At least about 65% of the fatty acids are $C_{14}$–$C_{20}$ saturated fatty acids. This method is particularly useful for controlling browning of a dough containing reducing sugars used to prepare chewy or soft cookies or the chewy regions of a dual-textured cookie, without imparting an off-flavor to the cookies.

DETAILED DESCRIPTION OF THE INVENTION

Figure 1:
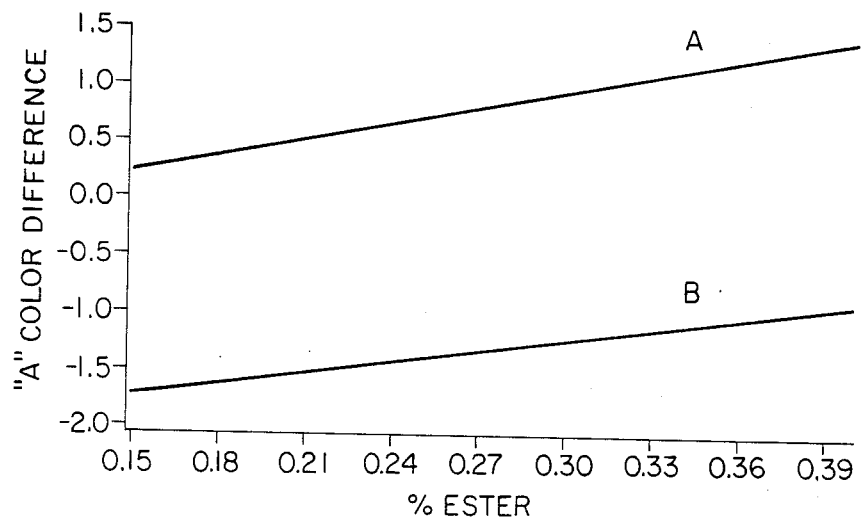
FIG. 1 is a graph of percent monoglyceride ester of a polycarboxylic acid versus a-color difference for cookies containing 0.35% soda. Line A represents cookies baked at 310° F. (154° C.) and Line B represents cookies baked at 290° F. (143° C.).

The present invention relates to a method for reducing excessive browning in baked goods. Applicants encountered a problem concerning color variations in dual-textured cookies of the type disclosed in U.S. Pat. No. 4,455,333, issued June 19, 1984, to Hong and Brabbs. These cookies are made from at least two different doughs, one or more first doughs containing crystallization-resistant sugars, and one or more second doughs containing readily crystallizable sugars, e.g., sucrose. The crystallization-resistant sugars generally include some reducing sugars. Fructose and glucose are reducing monosaccharides that readily undergo the Maillard reaction (browning) at a pH above 6. Sucrose, on the other hand, is a non-reducing disaccharide that participates in browning reactions only after hydrolysis into its component monosaccharides. Therefore, the first dough in a dual-textured cookie tends to brown more readily than the second dough, becoming darker in color. This browning occurs both in the oven and during the first several days after baking. During the cooking-making process for a dual-textured cookie wherein one or more doughs containing crystallization-resistant sugar is enveloped within an outer dough containing readily crystallizable sugar, if the outer cookie dough (the one containing sucrose) does not completely encapsulate the first or inner dough, the inner dough will flow onto the upper cooking surface during baking. When the inner dough undergoes browning reactions, it appears as dark orange or brown patches against a lighter tan crust. Thus the inner dough "shows" or provides a different color on the cookie crust, resulting in an unappealing cookie appearance. For dual-textured cookies prepared from different geometric configurations of the two types of doughs, color variation can also lead to an unattractive appearance. When a soft or chewy cookie is made using a single cookie dough comprising reducing sugars, the cookie takes on a dark orange or dark brown color instead of light brown or tan.

Applicants examined several methods of solving this problem. It was known that browning reactions occur more readily at a pH over 6. It was also known that an increase in the amount of baking soda generally increases the dough pH. Unfortunately, lowering the amount of baking soda to drop the pH below 6 is usually not an option, because soda is needed for leavening which affects the density of the cookie. If a very low level of soda is used in order to reduce browning, there is an insufficient amount of leavening action in the dough, i.e., the dough is not raised enough during baking and a more dense cookie is obtained. A number of acid leavening agents including sodium aluminum phosphate (SALP), monocalcium phosphate (MCP), and anhydrous monocalcium phosphate (AMCP) were added to the dough containing the reducing sugars at various levels to lower the pH of the dough. Unfortunately, when these leavening agents were used at concentrations high enough to significantly lower the pH and thus to control the browning reactions and dark color development, bitter or sour off-flavors developed in the cookies.

Surprisingly, it has now been discovered that the presence of a fatty acid monoglyceride ester of a polycarboxylic acid and derivatives of these materials in a dough containing reducing sugars is effective in reducing excessive browning without imparting an off-flavor to the dough finished baked good. The polycarboxylic acid ester is thought to react with the baking soda to lower the pH of the dough. It also affects the texture and flavor of the baked product since these materials function as emulsifiers.

While this invention is particularly useful for minimizing browning in dual-textured cookies and soft and chewy cookies. It is also useful in any baked goods in which browning is a problem. For example, the use of high fructose corn syrup in white layer cakes can result in browning due to the occurrence of the Maillard reaction. Therefore, while the invention is exemplified with a description of its use in cookies, it is not intended to be limited. All baked goods, e.g. cakes, muffins, breads, and cookies can be made using this invention.

Monoglyceride esters of polycarboxylic acids are fatty acid monoglyceride esters of di- or tricarboxylic acids. The monoglyceride esterifies one of the acid groups of the di- or tricarboxylic acid. Polycarboxylic acids which contain hydroxyls, e.g. citric or tartaric acid, are usually esterified also, i.e. the diacetyl tartaric or citric acid derivatives are used.

By "derivative" is meant a short chain ($C_2$ to $C_8$) fatty acid ester of a hydroxy di- or tricarboxylic acid. The preferred derivative is acetylated polycarboxylic acids. The terms "fatty acid monoglyceride polycarboxylic acids and its derivatives" and "monoglycerides of polycarboxylic acids" are used interchangeably herein.

Examples of monoglyceride esters of polycarboxylic acids suitable for use in the present invention are maleic acid esters of monoglycerides, succinic acid esters of monoglycerides, citric acid esters of monoglycerides, tartaric acid esters of monoglycerides, malic acid esters of monoglycerides, and their derivatives, or mixtures thereof. Preferred esters are diacetyl tartaric acid esters of monoglycerides, citric acid esters of monoglycerides, and succinylated monoglycerides. Most preferred are diacetyl tartaric acid esters of monoglycerides.

At least about 65% of the fatty acids of the monoglyceride portion of the fatty acid monoglyceride polycarboxylic acids are selected from the group consisting of $C_{14}$–$C_{20}$ saturated fatty acids and mixtures thereof.

By "baking soda" is meant one of, or a combination of, the common sodas used in baking, such as sodium bicarbonate, sodium carbonate, ammonium bicarbonate, ammonium carbonate, potassium bicarbonate and potassium carbonate.

The baking soda and monoglyceride ester of a polycarboxylic acid must be present in specific amounts in the dough in which excessive browning is to be controlled. This is because the two compounds have opposite effects. Soda increases pH and increases browning, while the ester acts to decrease browning. The dough contains about 0.15% to about 0.65% baking soda and about 0.10% to about 0.65% monoglyceride ester of a polycarboxylic acid and its derivatives. Preferably, about 0.30% to about 0.55% baking soda and about 0.10% to about 0.45% polycarboxylic acid ester are used. Most preferably, the level of baking soda is from about 0.35% to about 0.45%, and the level of polycarboxylic acid ester is from about 0.15% to about 0.20%. The ratio of polycarboxylic acid ester to baking soda is from about 0.15:1 to about 4.33:1 (ester:soda).

While not wishing to be bound by theory, it it believed that the polycarboxylic acid ester controls browning by affecting the pH of the dough. For example, it is known that an increase in the level of sodium bicarbonate in the dough will increase the pH of the dough and thereby promote nonenzymic browning reactions. Diacetyl tartaric acid ester of monoglyceride has a free carboxyl group which can easily react with the sodium bicarbonate, resulting in the release of carbon dioxide and a lowering of the dough pH. The reacted sodium bicarbonate will not contribute further to the browning reactions. It is also known that sodium bicarbonate, upon heating, will form sodium carbonate, which is more basic, i.e. has a higher pH. The polycarboxylic acid ester, by reacting with the sodium bicarbonate, is believed to prevent the formation of sodium carbonate. The acetyl group of diacetyl tartaric acid esters of fatty acid monoglycerides also readily hydrolyzes in the presence of water. The released acetic acid is effective in neutralizing the soda.

In all of these reactions carbon dioxide is formed within the dough during baking. The soda is therefore still functioning as a leavening agent.

The products in which this process is particularly useful are soft or chewy cookies and dual-textured crisp and chewy cookies. As used herein, the "soft or chewy cookies" refer to cookies which are uniformly soft or chewy in texture. These cookies are made from a single cookie dough containing typical cookie ingredients such as flour, sugar, shortening, water and leavening. The sugar component is a crystallization-resistant sugar. The crystallization-resistant sugar will be primarily reducing sugar. The preferred sugars are fructose, glucose (or dextrose) and mixtures of these sugars with sucrose or other mono- and disaccharides. Preferred sources of these sugars are corn syrup, high fructose corn syrup, honey, invert syrup and invert sugar.

The dual-textured cookies in which this invention is particularly useful are those described in U.S. Pat. No.

4,455,333, issued to Hong and Brabbs (1984). These cookies are of the "crumb-continuous" type which typically have a predominantly uniform distribution of the ingredients throughout the cookie, e.g., oatmeal cookies, chocolate chip or Toll House TM cookies, peanut butter cookies, sugar cookies, and other drop-type cookies. This is in distinction to the filled, coated, and sandwich-type cookies known to the art.

The dual-textured cookies preferably comprise a matrix made from typical cookie ingredients and being characterized in having distributed therein discrete regions containing readily crystallizable sugar and discrete regions containing crystallization-resistant sugar, whereby the product, when baked, provides a storage-stable plurality of textures, the regions containing crystallized sugar providing a crisp texture, and the regions containing crystallization-resistant sugar providing a chewy texture. The crystallization-resistant sugar will be primarily reducing sugar. In its preferred execution, the dual-textured cookies are made by substantially enveloping a first dough containing crystallization-resistant sugar within a layer of said second dough containing readily crystallizable sugar, thereby forming a ready-to-bake, laminated dough structure.

By "crystallization-resistant sugar" is meant a mono- or disaccharide, or mixture of mono- and/or disaccharides, which crystallizes, at the water content and water activity encountered in the semimoist cookies of the home-baked type, substantially more slowly than sucrose under the same conditions, typically remaining uncrystallized for periods of at least 1–6 months. The water activity of cookies is from about 0.25 to about 0.8. Preferably, the water activity of cookies of this invention is about 0.45 to about 0.70. Particularly good crystallization-resistant sugars are fructose, dextrose, and mixtures of sugars of which fructose and dextrose together comprise at least about 15% by weight, and solutions thereof. Others include psicose, fructose, sorbose, tagatose, allose, altrose, mannose, gulose, idose, galactose, talose, maltose, and lactose. The term "crystallization-resistant sugar" is also used herein to denote the combination of a readily crystallizable sugar and a crystallization inhibitor.

"Monosaccharides" and "disaccharides" as used herein are compounds well known in the art. Monosaccharides have the empirical formula $(CH_2O)_n$, where n is greater than or equal to 3. The carbon skeleton of the common monosaccharides is unbranched and each carbon except one bears an —OH group; the remaining carbon is generally combined in an acetal or ketal linkage. Hexoses, both aldose and ketose forms, straight chain and pyranose or furanose forms, are preferred herein. The ketohexoses include psicose, fructose, sorbose, and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose, and sucrose.

By "reducing sugars" herein are meant those sugars which are generally recognized as reducing sugars because of their reaction with Benedict's solution. All monosaccharides are reducing sugars, as are some disaccharides. Sucrose is not considered to be a reducing sugar. Reducing sugars undergo nonenzymic browning reactions much more readily than nonreducing sugars. As described in the "Nonenzymic Browning Reactions" article by Shallenberger et al., "the reactivity of the sugars in nonenzymic browning reactions generally parallels their reactivity in other respects. Pentoses are more reactive than hexoses, and hexoses in turn are more reactive than reducing disacchardes. Nonreducing disaccharides participate in browning reactions only after they are first hydrolyzed to their component monosaccharides. L-arabinose is more reactive than D-xylose. Mannose is more reactive than glactose which is more reactive than glucose. Typical reducing sugars are fructose, glucose, dextrose, lactose, levulose, and maltose. Reducing sugars are available commercially in the form of high fructose corn syrup, invert syrup, invert sugar, honey, and other similar forms.

By "typical cookie ingredients" is meant those ingredients common to virtually all cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without heat and/or steam treatment.

By "shortening" is meant edible fats and oils suitable for baking, as well as combinations of edible fats and/or oils with appropriate food grade emulsifiers, such as polyglycerol esters, sucrose monoesters, mono- and diglycerides, lecithins, and the like. Also included are oleaginous products such as butters and margarines.

By "baking" herein is meant radiant, conductive, dielectric or convective exposure to energy of a type which imparts thermal energy to the product being baked. It thus includes conventional, convection, dielectric and microwave oven baking. Typically, cookies are baked for about 8–12 minutes at about 325° F.–375° F.

The soda is added as a dry ingredient with the flour or other dry ingredients, e.g. flavors, salt, oats, etc. It can also be dissolved in water or other aqueous ingredients, e.g. egg white, high fructose corn syrup, and added to the dough in that manner.

The fatty acid monoglyceride polycarboxylic acid and its derivatives are preferably added to the shortening before the shortening is mixed with the other ingredients.

It will be appreciated that minor modifications of the method of the present invention, within the skill of those in the baking arts, can be undertaken without departing from the spirit and scope of the invention. In particular, control of browning in baked goods while avoiding off-flavor development, through use of baking soda and fatty acid monoglyceride esters of polycarboxylic acids and their derivatives, however practiced, is within the spirit and scope of the present invention.

COLOR MEASUREMENTS

A MacBeth Color Meter System Model 1500 was used to measure the L, a, and b colors of the doughs. MacBeth reference standards and calibration plates were employed. The values are units of light reflectance measurement or luminosity, and the higher the value is the lighter the color is since a lighter colored material reflects more light. In particular, the "L" scale contains 100 equal units of division. Absolute black is at the bottom of the scale (L=0), and absolute white is at the top of the scale (L=100). The "a" scale measures color hue and chroma between red and green. The "b" scale measures color hue and chroma between blue and yellow. Hue is analogous to the dominant wavelength, while chroma relates to the color purity.

For dual-textured cookies, two measurements are taken on each cookie. One measurement is taken where inner dough is showing through on the surface of the cookie, and the other measurement is taken on outer dough immediately adjacent to the inner dough previously measured. The cookie must be free of chips or exposed particles at the areas where the measurements are taken. A small rectangular slit is used as the viewpoint so that accurate readings can be taken on an area of only inner dough and then an adjacent area of only outer dough. For each analysis a minimum of 16 cookies are measured. The average L, a and b values for the inner and outer dough of the cookies are reported.

The following examples illustrate the effectiveness of adding a combination of soda and a monoglyceride ester of a polycarboxylic acid and its derivatives to minimize the browning of the inner dough of dual-textured cookies. These examples are not limiting and are illustrative of the invention.

EXAMPLE 1

Samples of dual-textured crumb-continuous cookies were baked, having an inner dough with fructose as the primary sugar and an outer dough with sucrose as the primary sugar. The following formulations and baking procedures were used:

Sample A:

| Inner Dough | Weight |
| --- | --- |
| High fructose corn syrup | 2812.3 g. |
| Baking soda | 45.4 g |
| Homogenized whole eggs | 182.0 g |
| Shortening* | 1678.3 g. |
| Distilled monoglyceride** | 58.4 g |
| Sugar (sucrose) | 1134.0 g. |
| Flour | 2880.4 g. |
| Monocalcium phosphate (MCP) | 23.8 g. |
| Anhydrous monocalcium phosphate (AMCP) | 11.3 g. |
| Starch | 199.8 g |
| Salt | 36.3 g. |

*The soft shortening was a hydrogenated vegetable oil
**The distilled monoglyceride used was a commercial product having the following specifications: minimum of 90% monoester; maximum of 1.5% free fatty acid; maximum of 1% free glycerol; iodine value [approx.] of 60; melting point [approx.] of 60° C. [140° F.].

The distilled monoglyceride was melted at 140° F. and added to the melted shortening. The shortening and emulsifier were then added to the high fructose corn syrup, soda, and eggs. These ingredients were mixed at medium speed for about 4 minutes. (The mixer used was a Hobart Model #M802H, manufactured by Hobart Corp., Troy, Ohio.) Half the sugar was then added and the mixture was blended for about 1 minute at medium speed.

The flour, monocalcium phosphate, anhydrous monocalcium phosphate, salt, and starch were added and mixed together with the above-mentioned ingredients at low speed for about 1 minute. The remaining sugar was added and the whole was mixed at low speed for about 1 minute to form the inner dough.

To this dough was added about 5.1 lbs. of chocolate chips.

| Outer Dough | Weight |
| --- | --- |
| Water | 997.9 g. |
| Molasses | 170.1 g. |
| Baking soda | 56.7 g. |
| Whole eggs | 113.0 g. |
| Distilled monoglyceride** | 62.9 g. |
| Shortening* | 2086.6 g. |
| Sugar (sucrose) | 3955.4 g. |
| Flour | 3692.3 g. |
| Salt | 68.1 g. |
| Starch | 56.8 g. |
| Egg white solids | 28.4 g. |

Water, molasses, baking soda, and the whole eggs were mixed at medium speed for about 3 minutes. The monoglyceride was melted and added to the shortening at 140° F. (melted shortening). The shortening and monoglyceride were mixed together with the other ingredients for about two minutes at medium speed. Sugar (988.8 g.) was added and the mixing was continued at low speed for about 1 minute. The dry ingredients were added (flour, salt, starch and egg solids) and the mixture was blended for one minute at low speed. The remaining sugar was added and the dough was mixed for about 1 minute at low speed.

Sample B:

The inner dough for this sample was prepared as described above for the inner dough of Sample A, except that the monocalcium phosphate and the anhydrous monocalcium phosphate were replaced by 28.4 g. sodium aluminum phosphate, hereinafter denoted as "SALP".

The outer dough for Sample B was prepared the same as the outer dough for Sample A.

Sample C:

The inner dough of Sample C was prepared as in Sample A, except that 36.3 g. of baking soda was used, and the monocalcium phosphate (MCP) and anhydrous monocalcium phosphate (AMCP) were replaced by 22.7 g. of sodium aluminum phosphate (SALP).

The outer dough of Sample C was prepared as in Sample A.

Sample D:

The inner dough was made as for Sample A, with the following exceptions. To the soda, water, whole eggs mixture was added 28.35 g. diacetyl tartaric acid ester of monoglyceride. The diacetyl tartaric acid ester of monoglyceride was a commercial product having the following specifications: saponification value of 395–420, acid value of 62–76; iodine value—maximum of 3; melting point (approx.) of 45° C. No MCP or AMCP were used in the inner dough.

The outer dough for Sample D was prepared like the outer dough for Sample C.

The key distinguishing ingredients in Samples A, B, C, and D, are summarized as follows:
Sample A: 0.5% soda, 0.26% MCP, 0.13% AMCP
Sample B: 0.5% soda, 0.314% SALP
Sample C: 0.4% soda, 0.25% SALP
Sample D: 0.4% soda, 0.31% diacetyl tartaric acid ester of monoglyceride.

All the samples were formed by a custom-built double ram coextruder aand baked on a Middleby-Marshall oven (Model JS250) at 305° F. for 7½ minutes. Any equivalent coextruder can be employed, such as Model No. DDP 200-9005, available from Bepex Hutt GmbH, Postfach 9, Daimlerstrasse 9, D-7105 Leingarten, West Germany, or a Rheon encrusting machine, Model 207, available from Rheon Automatic Machinery Company, Japan. Products were cooled at room temperature.

The cookie samples were then inspected. In all the samples, inner dough show was minimized, relative to cookies presently available containing only soda, due to reduced inner dough browning. However, Samples A, B, and C had a distinctly noticeable off-flavor, as evaluated by a group of employees who tasted the cookies. Sample D did not have this off-flavor. This demonstrates that a combination of soda and diacetyl tartaric acid ester of monoglyceride can reduce excessive inner dough browning without imparting an off-flavor to the dough. The leavening acids, although minimizing browning, did cause an off-flavor.

EXAMPLE 2

Samples of dual-textured crumb-continuous cookies were prepared substantially as in Example 1, containing various levels of soda and diacetyl tartaric acid ester of monoglyceride in the inner dough. The diacetyl tartaric acid ester was the commercial product described in Example 1. Samples 1 and 2 contained 0.40% soda; Samples 3, 4, 7 and 8 contained 0.35% soda; and Samples 5, 6, 9 and 10 contained 0.65% soda. Samples 1 and 2 contained 0% ester; Samples 3, 5, 7 and 9 contained 0.15% ester; and Samples 4, 6, 8 and 10 contained 0.40% ester. Samples 1 and 2 were baked at 305° F. for 7½ minutes; Samples 3–6 were baked at 310° F. for 7½ minutes; and Samples 7–10 were baked at 290° F. for 8¼ minutes.

Table 1 lists the results of color measurements on the aforementioned samples. It was previously noticed that browning in cookies continued to occur after the baking was complete. Therefore, color measurements were made on fresh baked samples and on samples which had been stored at 70° F. for 14 days, the latter being more representative of commercially sold cookies.

TABLE 1

| Sample | Fresh Baked | | | Stored | | |
|---|---|---|---|---|---|---|
| | Δa | Δb | ΔL | Δa | Δb | ΔL |
| 1* | — | — | — | −1.17 | −0.05 | 11.88 |
| 2* | — | — | — | −1.33 | −0.65 | 7.70 |
| 3 | 0.585 | 1.125 | 2.635 | 0.236 | 1.496 | 9.467 |
| 4 | 2.38 | 1.480 | 0.095 | 1.400 | 1.553 | 5.514 |
| 5 | −2.66 | −1.215 | 1.73 | −4.494 | −1.154 | 5.942 |
| 6 | −2.255 | −2.385 | −3.11 | −2.306 | −1.018 | 3.799 |
| 7 | −1.345 | −1.195 | −2.17 | −1.726 | −0.040 | 8.760 |
| 8 | −0.495 | 0.065 | 0.385 | −0.908 | 0.067 | 4.686 |
| 9 | −2.815 | −2.770 | −2.01 | −4.877 | −2.044 | 8.291 |
| 10 | −2.35 | −2.455 | −0.615 | −3.509 | −1.609 | 6.594 |

Δa = (a-color of outer dough) − (a-color of inner dough)
Δb = (b-color of outer dough) − (b-color of inner dough)
ΔL = (L-color of outer dough) − (L-color of inner dough)
*For Samples 1 and 2, only measurements on stored cookies were done.

It was found that Δa-color gives the best measurement of inner dough browning. On the a-color scale, red is 100 and green is 0. A browner dough will have a higher a-color. If "Δa" is defined as a-color of outer dough minus a-color of inner dough, browning of the inner dough compared to the outer dough will result in a negative Δa.

Table 2 summarizes the soda and diacetyl tartaric acid ester of monoglyceride levels, the baking conditions, and the results of the color measurements expressed as Δa color.

It has now been found that Δa is a function of three variables: soda level, ester level, and degree of baking. This relationship is approximated by the following equation:

$$\Delta a = -12.2(\% \text{ soda}) + 4.4(\% \text{ ester}) + 0.1(\text{bake temperature}[°F.]) + K,$$

where $K = -19.685$. (The statistical F values for the soda, ester, and temperature coefficients are, respectively, about 200, 30, and 34.) Soda level is the predominant factor; an increase in soda level makes Δa much more negative because it raises the pH of the inner dough, thereby promoting browning. The results of this Example demonstrate that an increase in ester level results in a decrease in inner dough browning (a more positive Δa). The ester counters the effect of the soda, but a given amount of ester has only about one-third the effect on Δa as a given amount of soda. A higher degree of baking results in a more positive Δa, because additional baking makes the color of the outer dough browner, and there is then less difference between the inner and outer dough colors. In general, it can be said that low soda/high ester is best for minimizing excessive inner dough browning, high soda/low ester is worst, and low/low and high/high fall somewhere in between.

Figure 2:
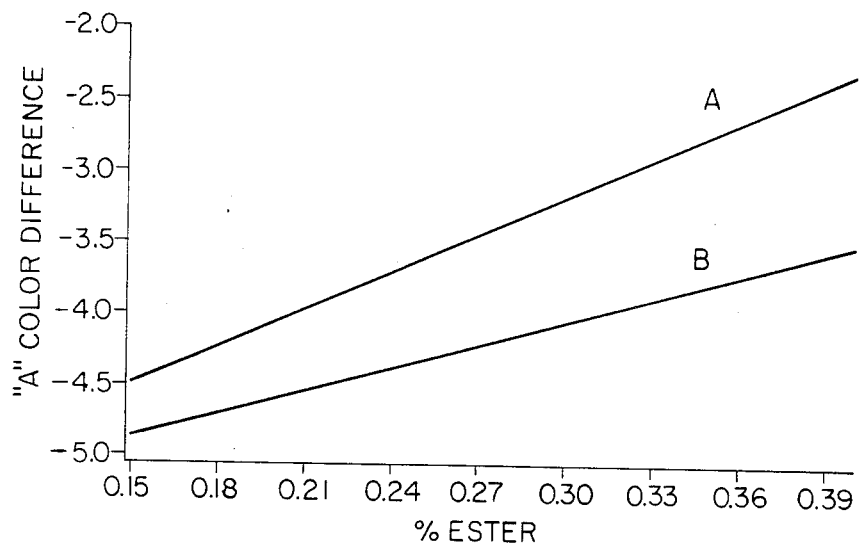
FIG. 2 is a graph of percent monoglyceride ester of a polycarboxylic acid versus a-color difference for cookies containing 0.65% soda. Line A represents cookies baked at 310° F. (154° C.) and Line B represents cookies baked at 290° F. (143° C.).

The data in Table 2 and FIGS. 1 and 2 illustrate these findings. As stated before, a more negative Δa means that more undesirable browning of the inner dough compared to the outer dough has occurred. In Table 2, Sample 3 contained a low level of both soda and ester (0.35% and 0.15%). The Δa was 0.236, indicating that the color of the two doughs was about the same. Sample 4 contained the same level of soda and a higher level of ester (0.40%). The ester effectively controlled inner dough browning so that the outer dough was browner than the inner dough, as illustrated by the positive Δa. Samples 1 and 2 contained about the same level of soda (0.40%) as Samples 3 and 4, but no ester was added to the inner dough; this resulted in Δa's of −1.17 and −1.33. More inner dough browning occurred because there was no ester present to counteract the soda.

Samples 5 and 6 contained about twice as much soda (0.65%) of Samples 3 and 4. Sample 5 contained only 0.15% ester, and the Δa of −4.494 illustrates that the inner dough became much browner than the outer dough. The high level of soda promoted browning of the inner dough, and the low level of ester did not effectively counteract the soda. Sample 6 contained the same amount of soda but a higher level of ester (0.40%). This higher ester level resulted in less inner dough browning, as illustrated by the Δa of −2.306.

Samples 7–10 had similar results. The baking conditions of 290° F. (143° C.) for 8¼ minutes for Samples 7–10 was a lesser degree of baking than the conditions of 310° F. (154° C.) for 7½ minutes for Samples 3–6. Therefore, as discussed above, the Δa's for particular soda/ester combinations in Samples 7–10 were more negative than the respective combinations in Samples 3–6.

FIGS. 1 and 2 illustrate the results. FIG. 1 is a plot of Samples 3, 4, 7 and 8 (0.35% soda), and FIG. 2 is a plot of Samples 5, 6, 9 and 10 (0.65% soda). A-color difference (Δa) is plotted against percentage of ester. Line A in both Figures represents cookies baked at 310° F. (154° C.), and Line B represents cookies baked at 290° F. (143° C.). It is clearly demonstrated that for a given soda level, an increase in the amount of diacetyl tartaric acid ester of monoglyceride reduces the amount of excessive browning of the inner dough.

TABLE 2

| Sample | Soda | Diacetyl Tartaric Acid Ester of Monoglyceride | Δa | Bake Temperature | Bake Time |
|---|---|---|---|---|---|
| 1 | 0.40% | 0% | −1.27 | 305° F. | 7½ min. |
| 2 | 0.40% | 0% | −1.33 | 305° F. | 7½ min. |
| 3 | 0.35% | 0.15% | 0.236 | 310° F. | 7½ min. |
| 4 | 0.35% | 0.40% | 1.400 | 310° F. | 7½ min. |
| 5 | 0.65% | 0.15% | −4.494 | 310° F. | 7½ min. |
| 6 | 0.65% | 0.40% | −2.306 | 310° F. | 7½ min. |
| 7 | 0.35% | 0.15% | −1.726 | 290° F. | 8¼ min. |
| 8 | 0.35% | 0.40% | −0.908 | 290° F. | 8¼ min. |
| 9 | 0.65% | 0.15% | −4.877 | 290° F. | 8¼ min. |
| 10 | 0.65% | 0.40% | −3.509 | 290° F. | 8¼ min. |

What is claimed is:

1. A method for reducing excessive browning in the portion of a dual-textured cookie containing crystallization-resistant sugar comprising reducing sugars, said method comprising adding to the dough containing said reducing sugars from about 0.15% to about 0.65% of a baking soda selected from bicarbonates and carbonates and mixtures thereof and from about 0.10% to about 0.65% fatty acid monoglyceride esters of polycarboxylic acids and derivatives thereof, wherein the polycarboxylic acid is selected from the group consisting of maleic, succinic, citric, tartaric, malic and diacetyl tartaric acid and mixtures thereof, wherein at least about 65% of the fatty acids in said monoglycerides are selected from the group consisting of $C_{14}$–$C_{20}$ saturated fatty acids and mixtures thereof, and baking the dough.

2. A method according to claim 1 wherein the polycarboxylic acid esters are selected from the group consisting of diacetyl tartaric acid esters of monoglycerides, citric acid esters of monoglycerides, and succinic acid esters of monoglycerides, and mixtures thereof.

3. A method according to claim 2 wherein the polycarboxylic acid esters are diacetyl tartaric acid esters of monoglycerides.

4. A method according to claim 1 wherein from about 0.30% to about 0.55% soda and from about 0.10% to about 0.45% fatty acid monoglyceride ester are added to the dough.

5. A method according to claim 4 wherein about 0.35% to about 0.45% soda and about 0.15% to about 0.20% fatty acid monoglyceride ester are added to the dough.

6. A method according to claim 1 wherein the reducing sugar is fructose.

7. A method according to claim 1 wherein the reducing sugar is high fructose corn syrup.

8. A method according to claim 1 wherein the reducing sugar is selected from the group consisting of invert syrup and invert sugar and mixtures thereof.

9. A method according to claim 1 wherein the reducing sugar is honey.

10. A method according to claim 1 wherein the cookie is a crumb-continuous dual-textured cookie having discrete regions of storage-stable crisp texture and discrete regions of storage-stable chewy texture containing reducing sugar in the chewy portion.

* * * * *